US007007283B2

(12) United States Patent
Lin

(10) Patent No.: US 7,007,283 B2
(45) Date of Patent: Feb. 28, 2006

(54) APPARATUS FOR ACCESSING DATA OF DISC

(75) Inventor: Chi-Cheng Lin, Taoyuan (TW)

(73) Assignee: Benq Corporation, Taoyuan (TW)

( * ) Notice: Subject to any disclaimer, the term of this patent is extended or adjusted under 35 U.S.C. 154(b) by 221 days.

(21) Appl. No.: 10/348,996

(22) Filed: Jan. 22, 2003

(65) Prior Publication Data

US 2003/0137916 A1 Jul. 24, 2003

(30) Foreign Application Priority Data

Jan. 24, 2002 (TW) ................................ 91101171 A

(51) Int. Cl.
*G11B 17/03* (2006.01)

(52) U.S. Cl. ..................................................... 720/600
(58) Field of Classification Search ................ 720/600; 369/75.11, 75.21, 77.11, 77.21, 291.1, 272.1
See application file for complete search history.

(56) References Cited

U.S. PATENT DOCUMENTS

| 3,695,741 | A | * | 10/1972 | Dollenmayer | .............. | 312/8.12 |
| 4,890,179 | A | * | 12/1989 | Baker | .......................... | 362/132 |
| 5,768,239 | A | * | 6/1998 | Sellers | .................... | 369/75.21 |
| 5,878,012 | A | * | 3/1999 | Watanabe et al. | ........ | 369/75.21 |
| 6,111,838 | A | * | 8/2000 | Akiba | ..................... | 369/77.11 |
| 6,341,115 | B1 | * | 1/2002 | Otani et al. | .............. | 369/77.11 |
| 6,577,577 | B1 | * | 6/2003 | Watanabe et al. | ........ | 369/75.21 |
| 6,643,243 | B1 | * | 11/2003 | Kurozuka et al. | ....... | 369/77.21 |
| 6,862,739 | B1 | * | 3/2005 | Hunter et al. | ............... | 720/653 |

FOREIGN PATENT DOCUMENTS

| JP | 363106980 A | * | 5/1988 |
| JP | 02003285501 A | * | 10/2003 |

* cited by examiner

Primary Examiner—Allen Cao
(74) Attorney, Agent, or Firm—Snell & Wilmer L.L.P.

(57) ABSTRACT

The present invention relates to an apparatus for accessing data on a disc. When the apparatus accesses the data on the disc, a portion of the disc is exposed. The apparatus includes an upper cover and a base. The upper cover contains a first protection element. The base contains a second protection element. When the apparatus is in use, the first and second protection elements prevent the disc from being touched.

9 Claims, 7 Drawing Sheets

US 7,007,283 B2

APPARATUS FOR ACCESSING DATA OF DISC

CROSS-REFERENCE TO RELATED APPLICATIONS

This Application claims priority to Taiwan Patent Application No. 091101171 entitled "Apparatus For Accessing Data Of Disc", filed on Jan. 24, 2002.

FIELD OF INVENTION

The present invention relates to an apparatus which accesses data on a disc, and more specifically, to an apparatus in which a portion of the disc is exposed to the external area of the apparatus as the disc is inserted into the apparatus.

BACKGROUND OF THE INVENTION

Due to the progress of the electronic technology, many methods are available to store data. Among these methods, the most popular one is to store data on a portable disc of large storage space.

In addition to storing the audio data, a disc is used to store data of other types since the popularity of CD recorder. Storing data of different types diversifies the disc formats, e.g. CD ROM mode 1/2, XA mode, and so on. Therefore, in addition to the conventional CD and CDR, the CD-RW and DVD are introduced into the market place meeting consumers' need.

As mentioned above, the disc access apparatus for each disc format has to be supplied to the market because of the diverse disc formats. Moreover, most electrical apparatuses tend to be smaller and lighter in recent years to follow the market trend. However, most known disc access apparatuses have a cover for protecting the disc in use from accidental contact. Accordingly, the possible minimum size of the disc access apparatus of the prior art is restricted to the size of the disc and can not be reduced further.

SUMMARY OF THE INVENTION

The main aspect of the present invention is to provide an apparatus with the size smaller than a disc facilitating carrying and installation.

The present invention provides an apparatus for accessing data stored on a disc. The apparatus includes an upper cover and a base. When accessing data on a disc, a portion of the disc is exposed to the external area to the apparatus, i.e. the external area of the upper cover and the base.

The upper cover of the apparatus further includes a first protection element which is movably attached to the upper cover for protecting the disc while accessing the data.

The base of the apparatus further includes a second protection element which is movably attached to the base for protecting the disc while accessing the data.

DETAILED DESCRIPTION

The present invention provides an apparatus 100 for accessing data on a disc 120, wherein the disc 120 may be CD, CD-RW, DVD, or any other format.

Figure 1:
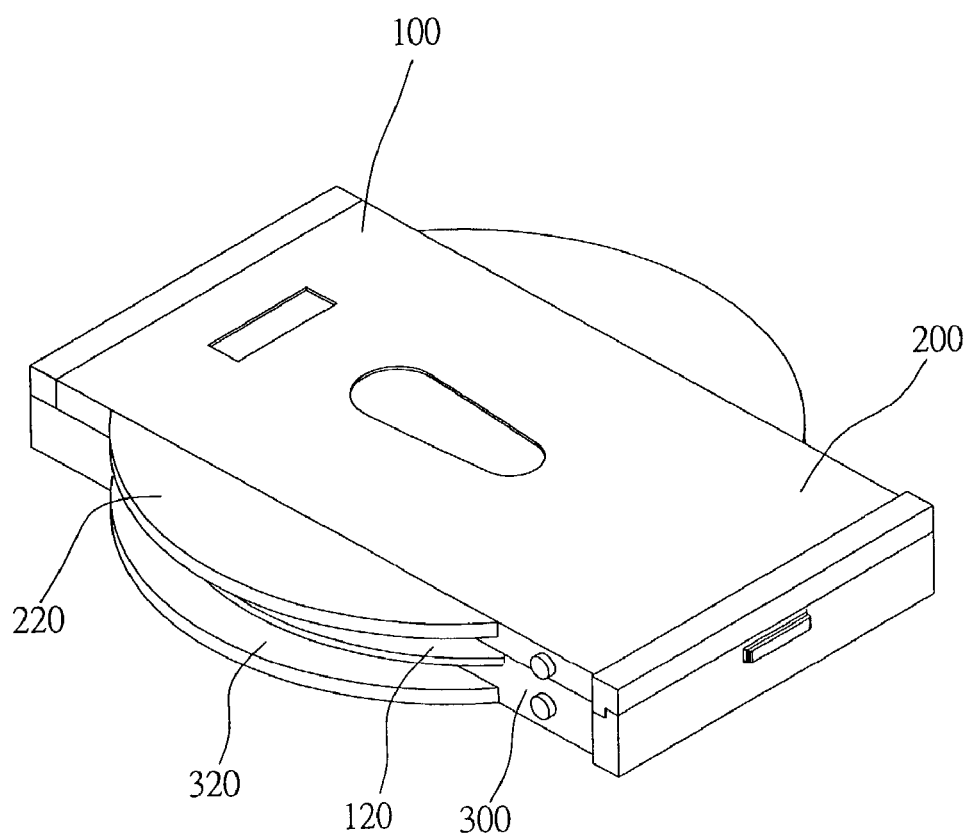
FIG. 1 illustrates the first embodiment of the present invention.

FIG. 1 illustrates an embodiment of the present invention. As FIG. 1 shows, the apparatus 100 of the present invention includes an upper cover 200 and a base 300. The upper cover 200 and the base 300 together define an internal area and an external area. When the disc 120 is inserted into the apparatus 100, a portion of the disc 120 is exposed to the external area. It means that the disc 120 is not completely covered within the upper cover 200 and the base 300, i.e., not completely covered within the apparatus 100. For the embodiment shown in FIG. 1, the disc 120 is exposed from the both sides of the apparatus 100. In accordance with other embodiments not shown here, the disc 120 is possibly exposed to one single side of the apparatus 100 only.

As FIG. 1 illustrates, the apparatus 100 further includes a first protection element 220 which is movably attached to the upper cover 200. It is applied herein to protect the disc 120 from casual contact when the apparatus 100 is in use. The first protection element 220 is a thin piece with a semi-circle shape and extends from one side of the upper cover 200. The apparatus 100 of the embodiment needs two first protection elements 220 extending from the both sides of the upper cover 200 to protect the disc 120 since the disc 120 is exposed from the both sides of the apparatus 100 as well. The shape of each first protection element 220 not only accepts semi-circle but also accepts any other form as long as it can provide the protection properly. The material of the first protection elements 220 might be plastics, alloy, steel, rubber, or any other material having similar characteristics.

Figure 2A:
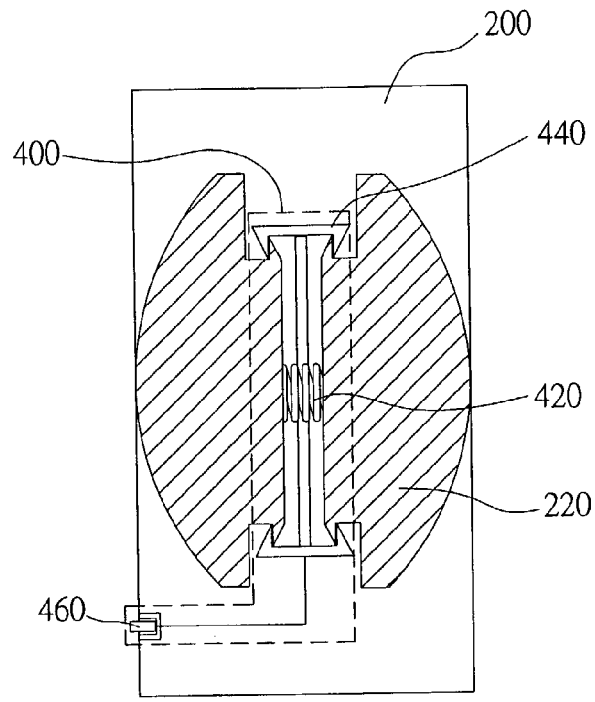
FIG. 2(a) illustrates the sectional view of the first embodiment as the first protection elements are contracted inwardly within the upper cover.
Figure 2B:
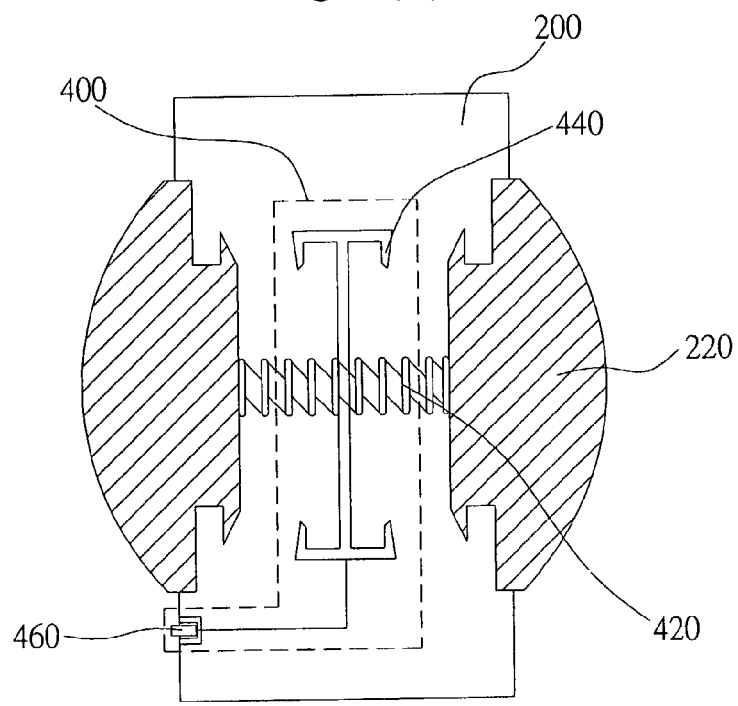
FIG. 2(b) illustrates the sectional view of the first embodiment as the first protection elements extend outwardly.

FIG. 2(a) illustrates the embodiment of the present invention as the first protection elements 220 are contracted inwardly within the upper cover 200. FIG. 2(b) illustrates the embodiment as the first protection elements 220 extend outwardly. As FIG. 2(a) shows, the first protection elements 220 are hidden within the upper cover 200 when no disc 120 is inserted into the apparatus 100. As FIG. 2(b) shows, a first driving device 400 drives the first protection elements 220 outward when the disc 120 is inserted into the apparatus 100.

The apparatus 100 of the present invention further includes the first driving device 400 for selectively driving the first protection elements 220. For the embodiment shown in FIG. 2(a) and FIG. 2(b), the first driving device 400 drives the first protection elements 220 by hand operation. The first driving device 400 includes a spring 420, a stopper 440, and a button 460. The spring 420 is connected to both first protection elements 220. The stopper 440 is engaged with both first protection elements 220 for retaining the first protection elements 220 contracted within the upper cover

200. The button 460 is attached to the stopper 440. The stopper 440 releases the first protection elements 220 as the button 460 is depressed. The spring 420 provides stretching force to push the first protection elements 220 out of the upper cover 200. After the release, the stretch of spring 420 results in the first protection elements 220 being pushed out of the upper cover 200. Hand operation is not the only way to achieve the above function. For example, meshing engagement can also be used herein to drive the first protection elements 220 outward.

Figure 3:
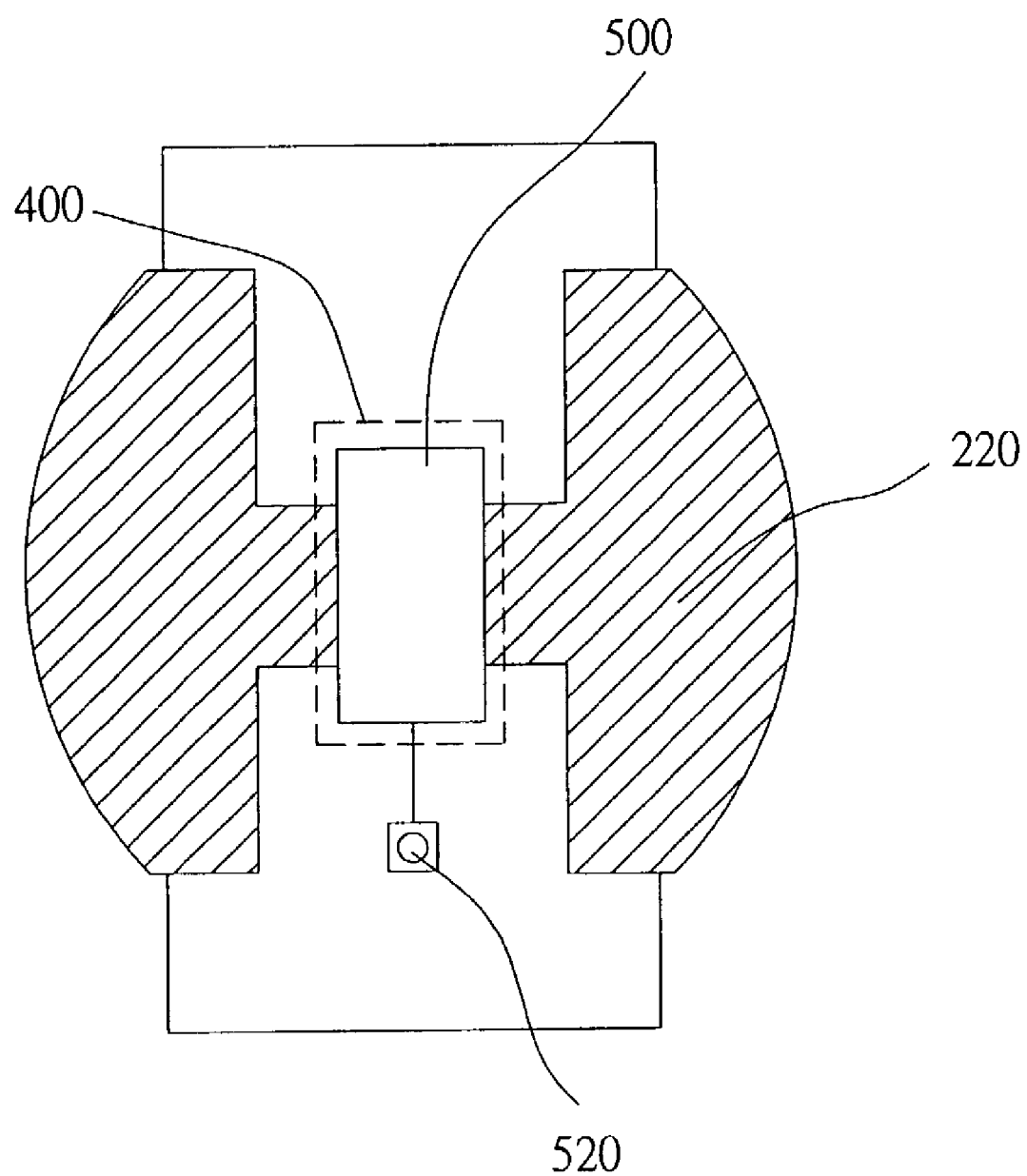
FIG. 3 illustrates the sectional view of an embodiment for an electrically-controlled device.

The embodiment shown in FIG. 3, different from the embodiment shown in FIG. 2(*a*) and FIG. 2(*b*), provides an electrically-controlled device 500 as the first driving device 400. The electrically-controlled device 500 includes a motor (not shown) to drive both first protection elements 220 outward and inward.

For the embodiment shown in FIG. 3, the apparatus 100 further includes a sensor 520 connected to the electrically-controlled device 500. When the sensor 520 detects the disc 120 having been inserted into the apparatus 100, it sends a signal to the electrically-controlled device 500. The electrically-controlled device 500 drives the first protection elements 220 outward by the time receiving the signal. The sensor 520 of the embodiment herein not only might adopt a contact sensor, e.g. a weight sensor, but also might adopt a non-contact sensor, e.g. an optics or a sound-wave sensor.

As FIG. 1 shows, the base 300 of the apparatus 100 further includes a second protection element 320, which is movably attached to the base 300, for protecting the disc 120 in use. For the embodiment shown in FIG. 1, the second protection element 320 is a thin piece with a semi-circle shape and extends from one side of the base 300. The apparatus 100 of the embodiment needs two second protection elements 320 extending from the both sides of the base 300 to protect the disc 120 since the disc 120 is exposed from the both sides of the apparatus 100 as well. The shape of each second protection element 320 not only accepts semi-circle but also accepts any other form as long as it can provide the protection properly. The material of the second protection elements 320 might be plastics, alloy, steel, rubber, or any other material having similar characteristics.

Figure 4A:
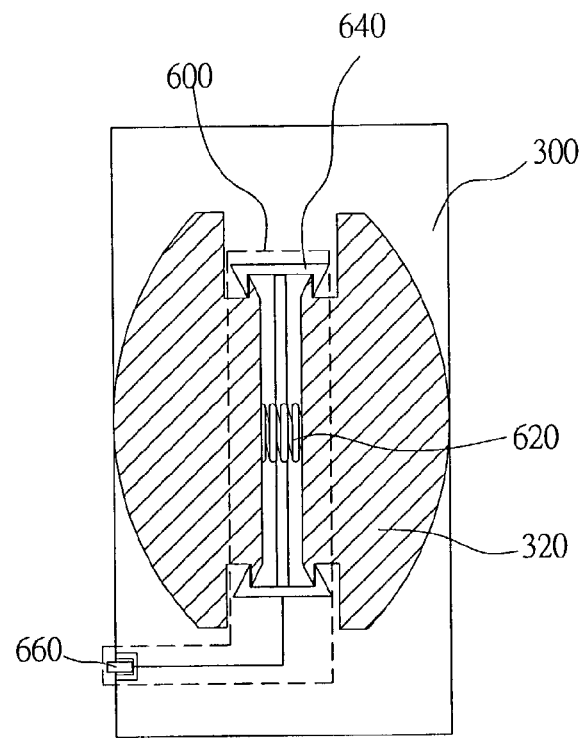
FIG. 4(a) illustrates the sectional view of the second embodiment as the second protection elements are contracted inwardly within the base.
Figure 4B:
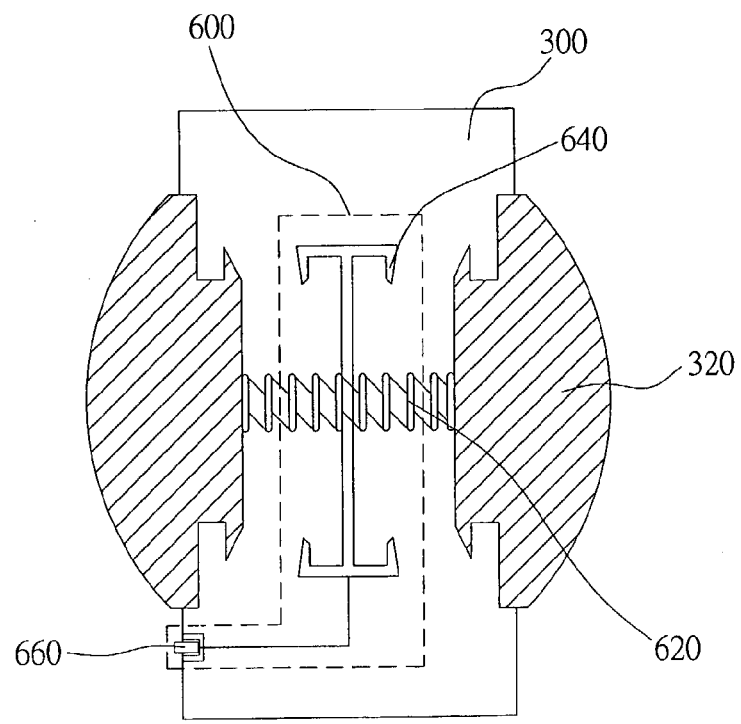
FIG. 4(b) illustrates the sectional view of the second embodiment as the second protection elements extend outwardly.

FIG. 4(*a*) illustrates the embodiment of the present invention as the second protection elements 320 are contracted within the base 300. FIG. 4(*b*) illustrates the embodiment as the second protection elements 320 extend outwardly. As FIG. 4(*a*) shows, the second protection elements 320 are hidden within the base 300 when no disc 120 is inserted into the apparatus 100. As FIG. 4(*b*) shows, a second driving device 600 drives the second protection elements 320 outward when the disc 120 is inserted into the apparatus 100.

The apparatus 100 of the present invention further includes the second driving device 600 for selectively driving the second protection elements 320. For the embodiment shown in FIG. 4(*a*) and FIG. 4(*b*), the second driving device 600 drives the second protection elements 320 by hand operation. The second driving device 600 includes a spring 620, a stopper 640, and a button 660. The spring 620 is connected to the second protection elements 320. The stopper 640 is engaged with the second protection elements 320 for retaining the second protection elements 320 within the base 300. The button 660 is attached to the stopper 640. The stopper 640 releases the second protection elements 320 as the button 660 is depressed. The spring 620 provides stretching force to push the second protection elements 320 out of the base 300. After the release, the stretch of spring 620 results in the second protection elements 220 being pushed out of the base 300. Hand operation is not the only way to achieve the above function. For example, meshing engagement can also be used to drive the second protection elements 320 outward.

Figure 5:
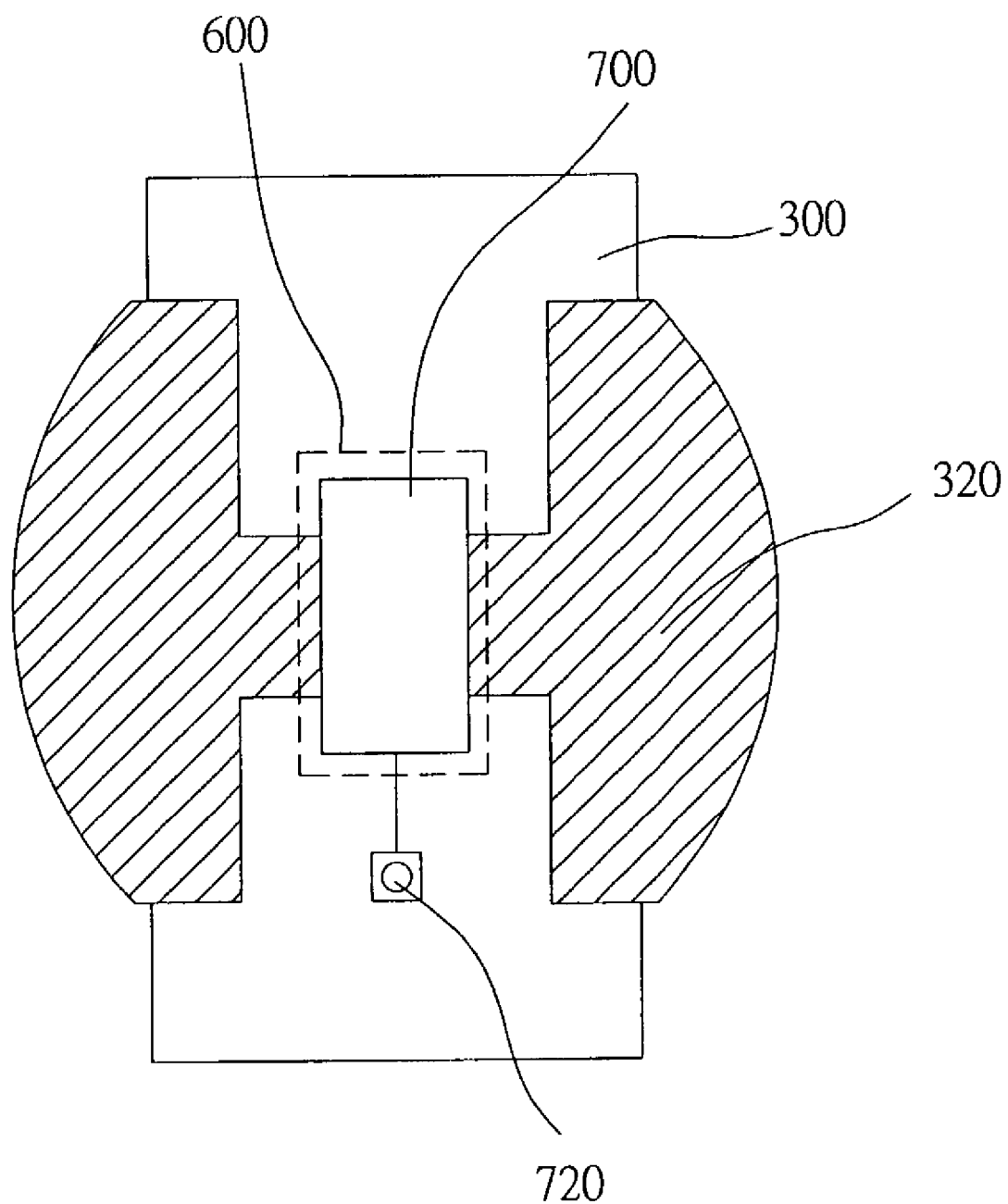
FIG. 5 illustrates the sectional view of an embodiment for an electrically-controlled device.

The embodiment shown in FIG. 5, different from the embodiment shown in FIG. 4(*a*) and FIG. 4(*b*), provides an electrically-controlled device 700 as the second driving device 600. The electrically-controlled device 700 includes a motor (not shown) to drive the second protection elements 320 outward and inward.

For the embodiment shown in FIG. 5, the apparatus 100 further includes a sensor 720 connected to the electrically-controlled device 700. When the sensor 720 detects the disc 120 having been inserted into the apparatus 100, it sends a signal to the electrically-controlled device 700. The electrically-controlled device 700 drives the second protection elements 320 outward by the time receiving the signal. The sensor 720 of the embodiment herein not only might adopt a contact sensor, e.g. a weight sensor, but also might adopt a non-contact sensor, e.g. an optics or a sound-wave sensor.

Figure 6A:
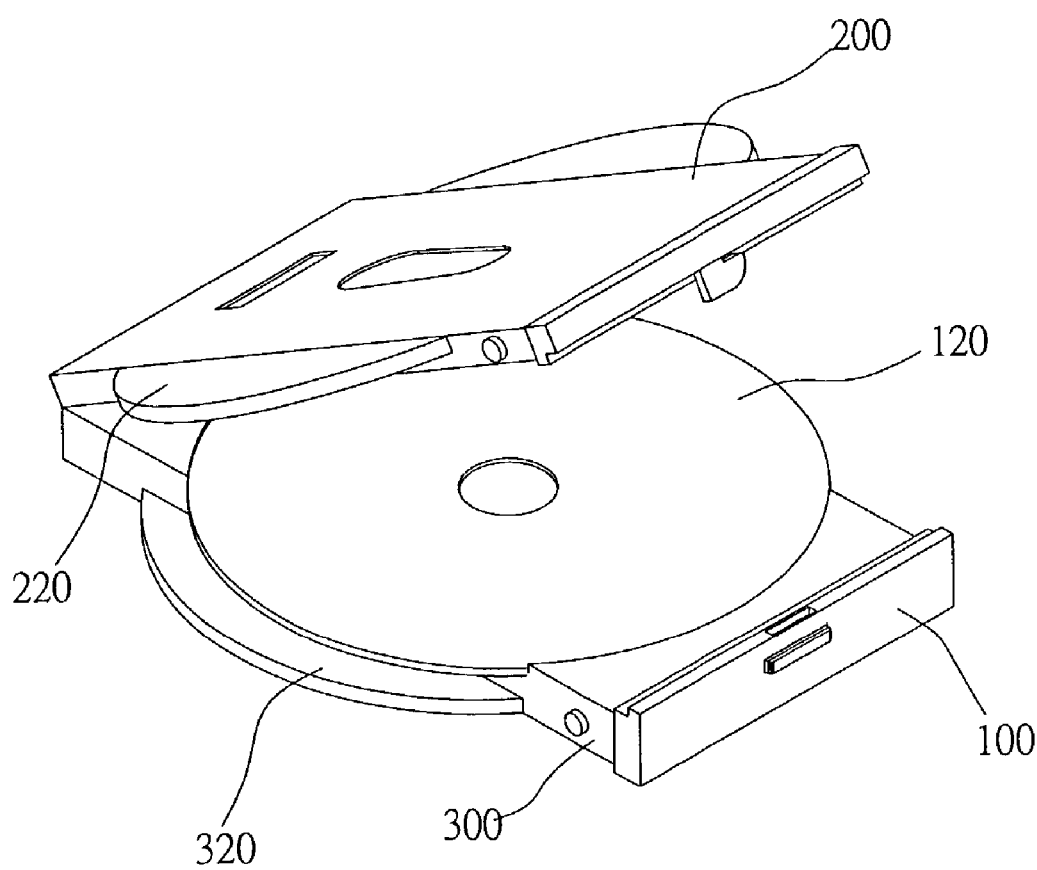
FIG. 6(a) illustrates the third embodiment in which the cover is liftable.
Figure 6B:
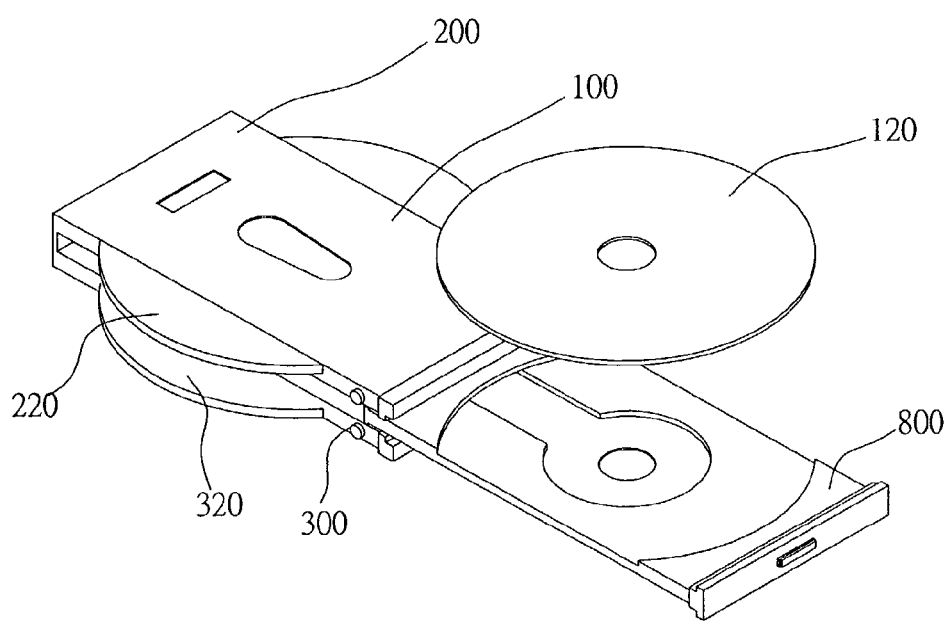
FIG. 6(b) illustrates a state in which the disc tray in FIG. (a) moves outwardly.

There are many methods to insert the disc 120 into the apparatus 100 of the present invention. As the embodiment illustrated in FIG. 6(*a*), one side of the upper cover 200 is coupled to one side of the base 300 such that the disc 120 can be inserted into the apparatus 100 by lifting the upper cover 200. As another embodiment illustrated in FIG. 6(*b*), the apparatus 100 further includes a disc tray 800 movably attached to the apparatus 100. The disc 120 can be inserted into the apparatus 100 by placing the disc 120 on the disc tray 800 after pulling it outward.

The above description of the preferred embodiments is expected to clearly expound the characteristics of the present invention but not expected to restrict the scope of the present invention. Those skilled in the art will readily observe that numerous modifications and alterations of the apparatus may be made while retaining the teaching of the invention. Accordingly, the above disclosure should be construed as limited only by the bounds of the claims.

The invention claimed is:

1. An apparatus for accessing data stored on a disc, comprising:
    an upper cover;
    a base coupled to the upper cover;
    to define an internal area and an external area, wherein the external area is out of cover of the upper cover and the base, and, as the disc is inserted into the apparatus, a portion of the disc is exposed to the external area;
    a protection element movably attached to the upper cover; and
    a driving device for selectively driving the protection element outward;
    wherein the driving device comprises:
    a spring connected to the protection element;
        a stopper, engaged with the protection element, for retaining the protection element within the upper cover; and
        a button attached to the stopper;
        wherein, as the button is depressed, the stopper releases the protection element and the spring drives the protection element outward.

2. The apparatus of claim 1, wherein the protection element is for protecting the portion of the disc exposed to the external area from casual contact as the disc is inserted into the apparatus.

3. The apparatus of claim 1, wherein the apparatus further comprises a disc tray movably attached to the apparatus for holding the disc.

4. The apparatus of claim 1, wherein the disc includes a compact disc (CD).

5. The apparatus of claim 1, wherein the disc includes a compact disc-rewritable (CD-RW).

6. The apparatus of claim 1, wherein the disc includes a digital video disc (DVD).

7. An apparatus for accessing data stored on a disc, comprising:
- an upper cover;
- a base coupled to the upper cover to define an internal area and an external area, wherein the external area is out of cover of the upper cover and the base, and, as the disc is inserted into the apparatus, a portion of the disc is exposed to the external area;
- a protection element movably attached to the upper cover; and
- an electrically-controlled device for selectively driving the protection element outward, wherein the apparatus further comprises a sensor connected to the electrically-controlled device, the sensor sending a signal to the electrically-controlled device for driving the protection element outward when the sensor detects the disc being inserted into the apparatus.

8. An apparatus for accessing data stored on a disc, comprising:
- an upper cover;
- a base coupled to the upper cover to define an internal area and an external area, wherein the external area is out of cover of the upper cover and the base, and, as the disc is inserted into the apparatus, a portion of the disc is exposed to the external area;
- a protection element movably attached to the base for protecting the disc; and
- a driving device for selectively driving the protection element outward;
- wherein the driving device comprises:
- a spring connected to the protection element;
- a stopper, engaged with the protection element, for retaining the protection element within the base; and
- a button attached to the stopper;
- wherein, as the button is depressed, the stopper releases the protection element and the spring drives the protection element outward.

9. An apparatus for accessing data stored on a disc, comprising:
- an upper cover;
- a base coupled to the upper cover to define an internal area and an external area, wherein the external area is out of cover of the upper cover and the base, and, as the disc is inserted into the apparatus, a portion of the disc is exposed to the external area;
- a protection element movably attached to the base for protecting the disc; and
- an electrically-controlled device for selectively driving the protection element outward, wherein the apparatus further comprises a sensor connected to the electrically-controlled device, the sensor sending a signal to the electrically-controlled device for driving the protection element outward when the sensor detects the disc being inserted into the apparatus.

* * * * *